E. McGRADY.
LOCK NUT.
APPLICATION FILED DEC. 28, 1914.
1,195,053.
Patented Aug. 15, 1916.
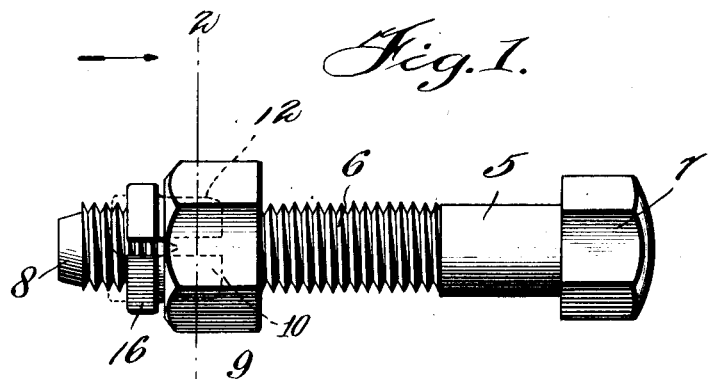
Fig. 1.
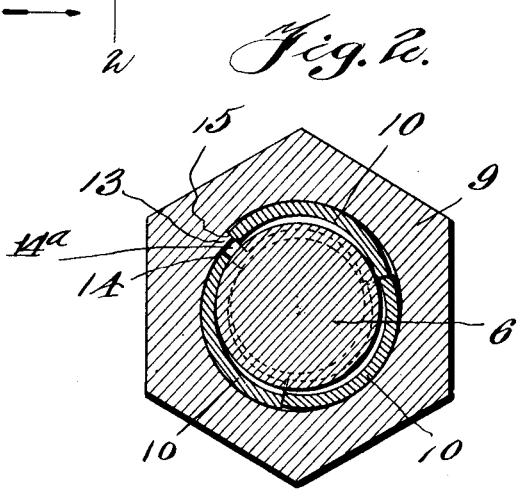
Fig. 2.
Fig. 4.
Fig. 3.
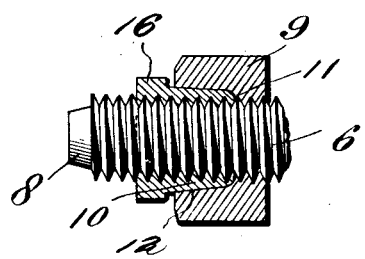
Witnesses
Inventor
Edward McGrady,

UNITED STATES PATENT OFFICE.

EDWARD McGRADY, OF SALEM, WEST VIRGINIA.

LOCK-NUT.

1,195,053.  Specification of Letters Patent.  Patented Aug. 15, 1916.

Application filed December 28, 1914. Serial No. 879,358.

*To all whom it may concern:*

Be it known that I, EDWARD MCGRADY, a citizen of the United States, residing at Salem, in the county of Harrison and State of West Virginia, have invented certain new and useful Improvements in Lock-Nuts; and I do hereby declare the following to be a full, clear, and exact description of the invention, such as will enable others skilled in the art to which it appertains to make and use the same.

This invention has for its object to provide a simple and efficient lock nut embodying essentially a nut having a threaded bore enlarged at one end and provided with an inwardly directed tooth to coöperate with a locking nut composed of a plurality of independently movable sections or segments to lock the nut against rotary movement in one direction on the shank of the bolt.

Another object is the provision of a lock nut in which is provided a radial shoulder for limiting the movement of the segments of the lock nut to prevent the latter from moving into locked engagement with the threads of the bolt as the nut is advanced thereon.

Another object is the provision of a nut lock embodying a bolt having a reduced plain extension on the threaded extremity thereof to facilitate quick and convenient fitting of the nut and locking members thereon.

With these and other objects in view, the invention consists in the novel construction, arrangement and formation of parts as will be hereinafter specifically described, claimed and illustrated in the accompanying drawing, in which:

Figure 1 represents a side elevation of a lock nut constructed in accordance with this invention. Fig. 2 represents a transverse sectional view on the line 2—2 of Fig. 1. Fig. 3 represents a fragmental longitudinal sectional view through the bolt and lock nut, and Fig. 4 represents a perspective view of a device for use in removing the lock nut from the bolt.

Referring to the drawing in detail, wherein similar reference numerals designate corresponding parts throughout the several views, the numeral 5 indicates the shank of a bolt having one end 6 threaded and a head 7 at the opposite end. The threaded extremity of the shank 5 is formed with a reduced and tapered extension 8 to assist in positioning the nut and locking members thereon.

The lock nut consists essentially of two parts the main nut 9 and the auxiliary or locking nut 10, the former being provided with the usual internally screw-threaded bore 11 to fit the threads of the bolt 6 and having one end of the core enlarged concentrically, as indicated at 12. The wall of the concentrically enlarged portion 12 of the bore is formed with an inwardly directed tooth 13 defining an eccentric or cam face 14 and a radially disposed shoulder 15. In the space between the wall of the enlarged bore 12 and the threaded shank 6 is disposed the auxiliary or lock nut 10, which is composed of a plurality of sections or segments, preferably three in number, and having their inner faces formed with screwthreads adapted to fit the threaded shank 6 of the bolt. The lock nut segments are permitted limited rotational movement within the enlarged bore 12 of the main nut 9 and are limited in their movement in one direction by the radial shoulder 15 and in the opposite direction by the eccentric face 14 of the tooth 13. The outer or exposed portions of the segments are enlarged to provide an angular head 16 on which may be fitted a wrench to adjust the lock nut relative to the main nut 9.

Referring to Fig. 4, wherein is shown a device for retaining the nut segments 10 in spaced relation to permit the removal of the main nut 9, the numeral 20 indicates an annular body to snugly fit the shank 6 of the bolt and one end 21 of which is tapered and extended angularly in parallel relation to the axis of the annular body and is adapted for insertion between several of the nut segments 10.

In use, the several lock nut segments 10 are positioned in the enlargement 12 of the bore of the main nut 9 and the threaded portion of the shank 5 of the bolt is inserted and rotated in the threaded bore of the nut so as to advance the latter on the threads of the bolt. The reduced tapered extension 8 of the bolt constitutes a guide for engaging and centering the several nut segments 10 so as to insure proper advancement of the bolt 6. As the main nut 9 is rotated so as to advance upon the threads of the bolt the nut segments 10 are moved to the position illustrated in Fig. 2 and are limited in their rotational movement relative to the main nut 9 by the engagement of one of the segments 10 with the radially disposed shoulder 15. When the nut is advanced to the desired position upon the bolt it is rotated a part of a revolution in a reverse direction so as to cause the nut segments 10 disposed between the eccentric face 14 of the tooth 13 and the threaded shank of the bolt to become firmly wedged or jammed and thus positively prevent subsequent rotation of the main nut 9 which would result in its removal.

When it is desired to remove the nut 9 from the bolt the annular body 20 is slipped over the threaded shank of the nut which is rotated to advance upon the threads of the bolt, thus releasing the nut segment 10 from its wedged position between the eccentric face 14 and the bolt 6 and permitting free rotation of the nut upon the bolt. The nut segments are retained in this position, with relation to the nut 9 to permit removal of the latter from the bolt, by slipping the annular body 20 over the threaded shank of the bolt and forcibly inserting the tapered extremity 21 thereof in the space 14ª between the nut segments 10, as illustrated in dotted lines in Fig. 1, thereby causing the nut segments to be spread or expanded and prevented from moving in the nut by frictional engagement with the wall of the enlarged portion 12 of the bore of the nut.

What I claim is:

1. A lock nut comprising a bolt having one end reduced and tapered, a nut having a threaded bore receiving said bolt and having one end thereof enlarged, a segmental nut disposed between the enlarged portion of said bore and said bolt having the inner face or bore screw-threaded, and means adapted to be inserted between the segments of the segmental nut to spread or expand the latter and permit removal of the first-mentioned nut.

2. A lock nut comprising a bolt, a nut having a bore receiving said bolt, said bore being enlarged at one end, an inwardly directed projection on the wall of the enlarged portion of said bore, and a nut including a plurality of independent segments disposed between the wall of the enlarged portion of said bore and said bolt having their inner faces screwthreaded, and means for retaining several of the segments of said nut in spaced relation to permit the removal of said nut.

In testimony whereof I affix my signature in presence of two witnesses.

EDWARD McGRADY.

Witnesses:
S. C. BOND,
C. M. DAVIS.